Nov. 3, 1925.  
W. F. JARNAGIN  
TRUCK  
Filed March 7, 1924  
1,560,164  
3 Sheets-Sheet 2
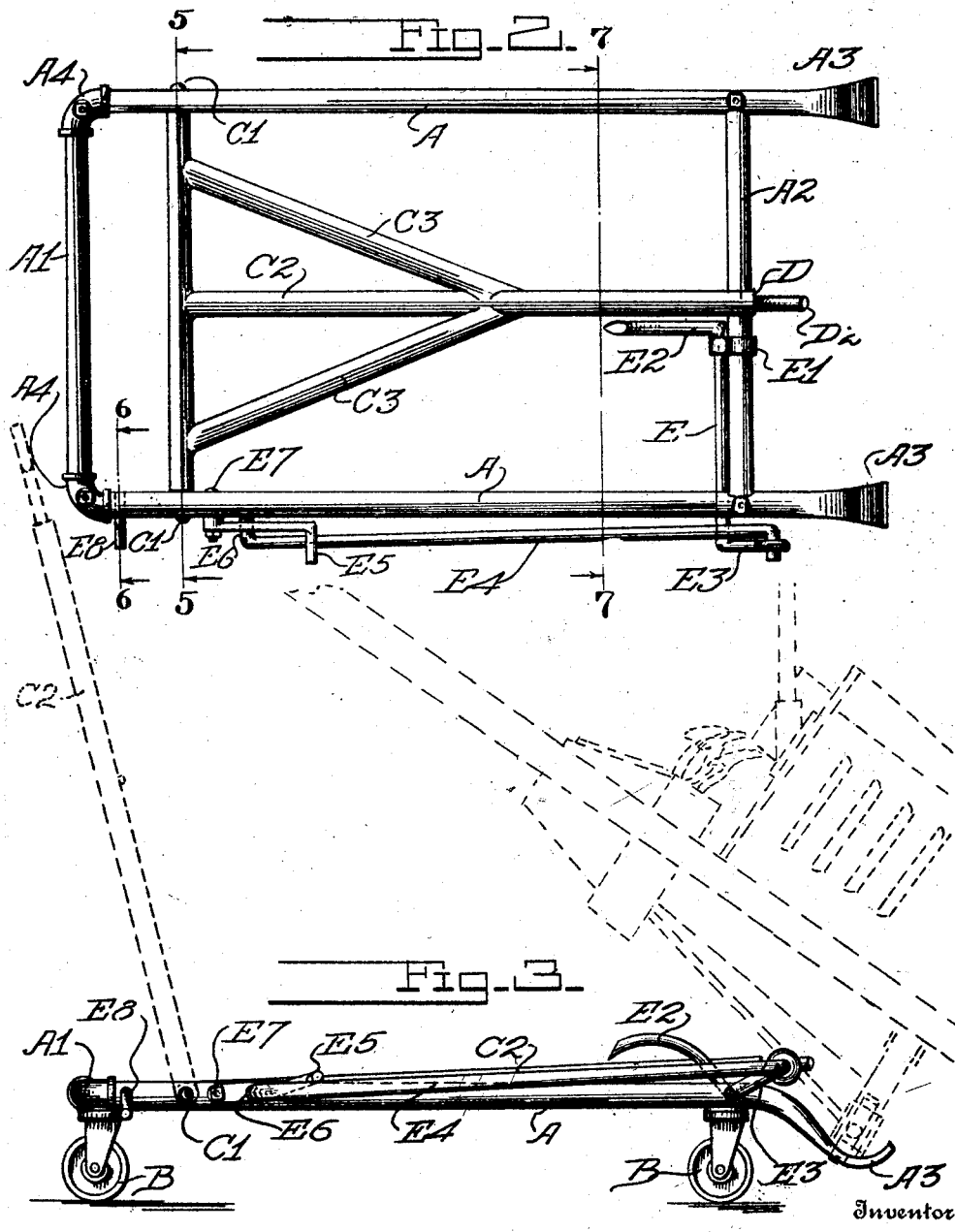
Inventor  
William F. Jarnagin  
By Cyrus Kehr  
Attorney

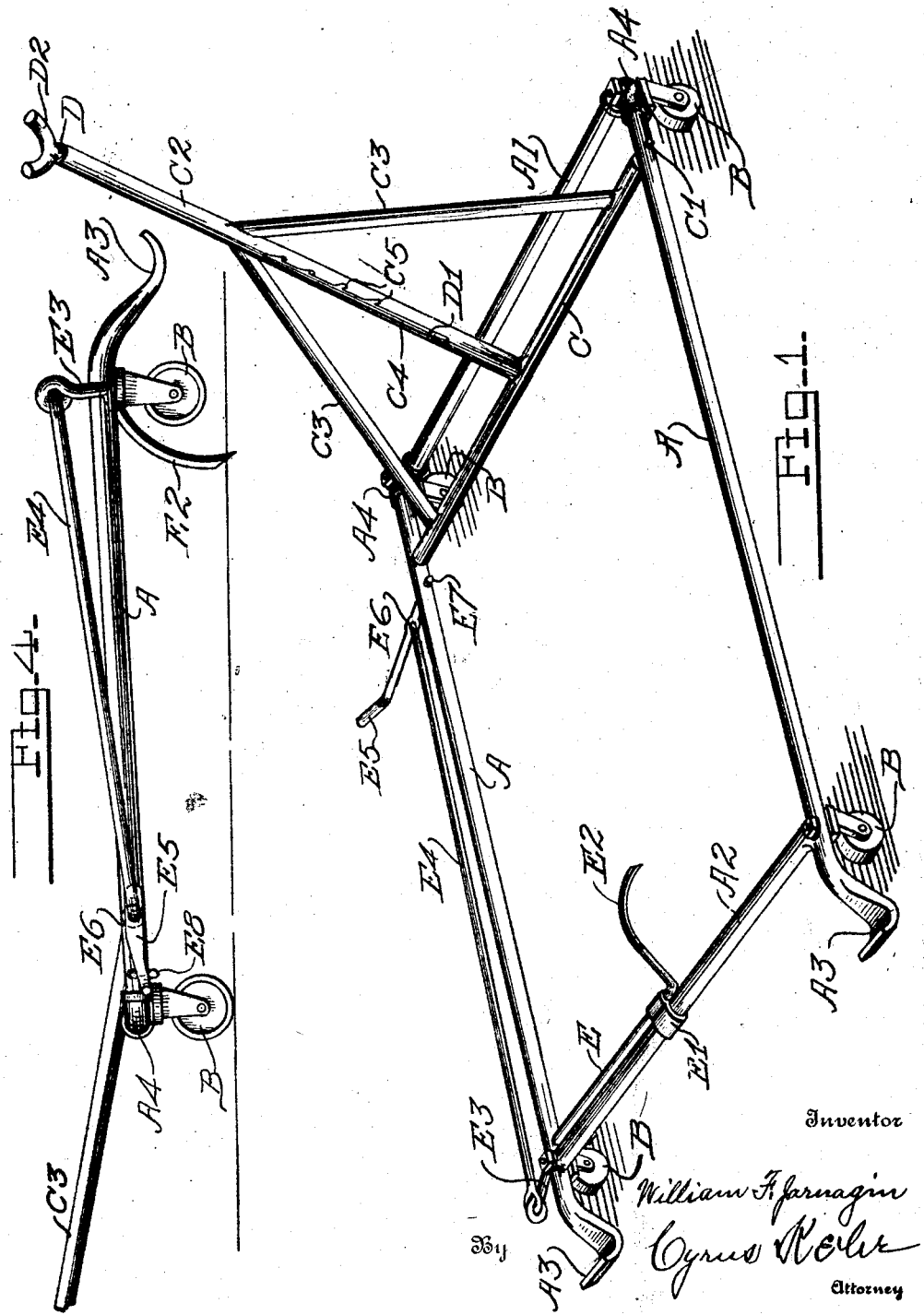

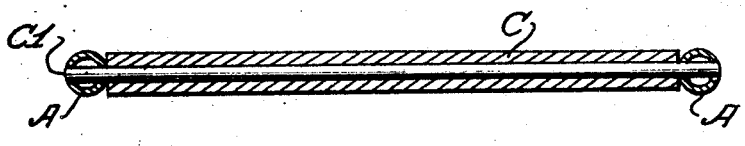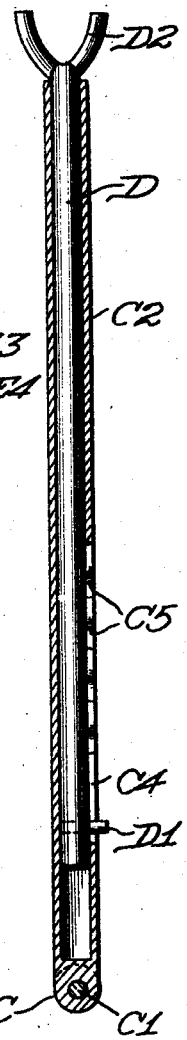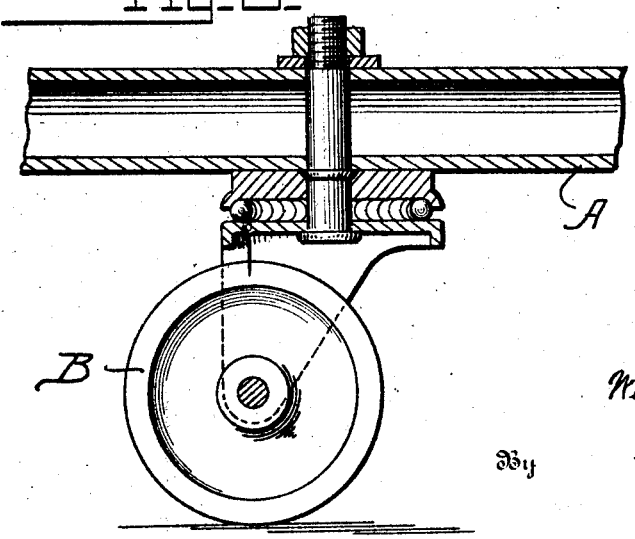

Patented Nov. 3, 1925.

1,560,164

UNITED STATES PATENT OFFICE.

WILLIAM F. JARNAGIN, OF RUTLEDGE, TENNESSEE.

TRUCK.

Application filed March 7, 1924. Serial No. 697,619.

*To all whom it may concern:*

Be it known that I, WILLIAM F. JARNAGIN, a citizen of the United States, residing at Rutledge, in the county of Grainger and State of Tennessee, have invented a new and useful Improvement in Trucks, of which the following is a specification, reference being had to the accompanying drawing.

My improvement relates generally to light trucks which are to receive loads of moderate weight and to be moved about by hand power.

The object of my invention is to produce a truck suited to the placing of automobile chassis and similar structures into box freight cars and also to remove such structures from box freight cars, as will hereinafter appear.

In the accompanying drawings,

Fig. 1 is a perspective illustrating my improved truck;

Fig. 2 is a plan of the same truck;

Fig. 3 is an elevation looking at the truck from the right;

Fig. 4 is a view similar to Fig. 3, the front end of the truck being raised from the floor;

Fig. 5 is a transverse, upright section on the line, 5—5, of Fig. 2, looking in the direction of the arrow;

Fig. 6 is an upright, transverse section on the line, 6—6, of Fig. 2, looking toward the left;

Fig. 7 is an upright, transverse section on the line, 7—7, of Fig. 2, looking toward the right;

Fig. 8 is a detail view showing the manner of attaching the casters;

Fig. 9 is a longitudinal section of the hinged column showing the extension member in said column and the means for engaging said column at different elevations.

Referring to said drawings, A, A are the side members. $A^1$ is the rear member and $A^2$ is the forward member of a rectangular elongated horizontal frame supported on four casters, B, one such caster being placed at each corner of the frame. Said four pieces of the frame are preferably formed of metal tubing. At the rear corners of the frame, the meeting ends of the frame pieces are joined to each other by tubular elbows, $A^4$. At the forward end of the frame, the side members, A, A are extended forward beyond the end piece, $A^2$; and the ends of said end piece abut against the side pieces and are secured thereto by brazing or welding or in any other convenient manner.

The extended forward ends of the side pieces, A, A, are curved downward and forward and upward to form hooks, $A^3$, adapted to engage and support the forward axle of the automobile, as will be described further on.

Near the rear end of the frame, a tubular cross member, C, extends horizontally and parallel to the rear end frame member, $A^1$, from one side member to the other. A shaft or rod, $C^1$, extends through the member, C, and through each side member, whereby the member, C, is rotatably supported. From a point about midway between the ends of the member, C, a tubular column, $C^2$, rises, the lower end of said column being immovably secured to the member, C. At each side of the column, $C^2$, is a brace, $C^3$, having one end secured to the member, C, and having its other end secured to the column, $C^2$. Thus the member, C, the column, $C^2$, and the brace, $C^3$, form a rigid frame turnable on the rod or shaft, $C^1$. This turning adapts the folding of this frame flatwise upon the main frame, the upper end of the column, $C^2$, being turned forward to lie upon the forward end frame member, $A^2$. Or this frame comprising the column, $C^2$, may be turned backward to rest upon the rear frame piece, $A^1$, in nearly the horizontal position (Fig. 4).

In the column, $C^2$, is an extension rod or shaft, D, slidable endwise and having at its lower end a lug, $D^1$, adapted to slide in the slot, $C^4$, of the column, $C^2$, and to move sidewise by the partial turning of the rod to bring said lug into any one of the side notches, $C^5$, formed at one side of the slot, $C^4$. Said notches are extended obliquely downward from the slot, $C^4$, so that when the lug, $D^1$, rests in one of said notches, the rod, D, is supported against downward movement.

At the upper end of the rod, D, is a fork, $D^2$, which is transverse to the length of the main frame.

Immediately in front of the forward end frame piece, $A^2$, is a rock shaft, E, extending loosely through the right hand member, A, of the main frame to about the middle of said frame piece, $A^2$. There said shaft rests in a bearing, $E^1$. The end of the rock shaft at the bearing, $E^1$, is extended downward to form a lifting arm, $E^2$, which normally is inclined rearward and which is long enough to lift the forward end of the frame to raise the forward casters, B, from the floor, the weight of the forward frame and the load thereon being then supported by the lifting arm, $E^2$. This is for the purpose of preventing movement of the truck at a certain stage of its operation, as hereinafter described. On the outer end of the rock shaft, E, is a crank, $E^3$, extending upward. Near the rear end of the frame a hand lever, $E^5$, extends upward and has its lower end coupled to the adjacent side member, A, by means of a horizontal bolt, $E^7$. A rod or link, $E^4$, has its forward end coupled to the upper end of the crank, $E^3$, and has its rear end coupled to the hand lever, $E^5$, at $E^6$ between the ends of said lever.

By drawing the upper end of the lever, $E^5$, rearward, the link, $E^4$, and the crank, $E^3$, are drawn rearward, whereby the rock shaft E, is turned for forcing the lower end of the arm, $E^2$, relatively forward. But the lower end of the lifting arm, $E^2$, will engage immovably in the floor and said arm will rock on said point of engagement, the upper part of said arm and the rock shaft and the entire main frame and all parts supported thereby going rearward a distance equaling the arc through which the upper part of the arm, $E^2$, moves. The purpose of this lifting and rearward movement will be explained further on. To hold the forward end of the frame in this raised position, the lever, $E^5$, is turned downward until the point, $E^6$, at which the link, $E^4$, is coupled to said lever is below the level of the bolt, $E^7$. Then the weight of the forward part of the frame continues to pull forward on the link, $E^4$, and tends to draw said lever downward. Such downward movement, if continued, would allow the rock shaft to turn in the reverse direction and permit the forward movement of the entire frame and the lowering of the forward end of the frame. This continued downward movement of the lever, $E^5$, is prevented by making contact between the lever and a locking stud, $E^8$, reaching outward on the outer face of the adjacent frame side member, A. When said arm rests on said stud, this lifting mechanism is locked and so remains until an attendant again lifts the lever, $E^5$.

Ford automobiles are usually shipped from the factory in box freight cars, the automobiles being without beds and without wheels. In other words, the chassis, with axles and engine and connections from the engine to the rear axle attached, is placed into the box car separate from other parts of the complete automobile. This chassis structure of the Ford automobile, when the engine has been applied, is of proper length to go crosswise into the box car, the forward end of the chassis structure being on the floor and close to one of the side walls of the box car, while the chassis structure rises from its forward end at an angle of about 45 degrees to the box car floor, the rear end of the chassis structure resting against the opposite side wall of the box car. Usually wooden cleats are secured to the side walls and floor of the box car to prevent the chassis structure from shifting by the jarring and jolting of the box car. Parts of the forward axle of the chassis structure rest on the car floor.

The operation of removing the chassis structure from the box car with the aid of my improved truck is as follows:—

The truck is set on the box car floor, resting on the casters, B, the extension rod, D, being placed in its lowest position in the column, $C^2$, and said column being turned rearward. Then the truck is pushed along the floor into position under the chassis, the forward end of the truck being directed toward the front axle of the chassis. Then the rear end of the truck is raised until the hooks, $A^3$, are low enough to pass under the front axle of the chassis. Then the truck is pushed forward until said hooks are under the front axle. Then the hand lever, $E^5$, is pressed downward into locked position, said lever resting on the lug or stud, $E^8$, whereby the lifting arm, $E^2$, is made to bear on the car floor, whereby the forward part of the truck and the axle and other forward parts of the chassis are raised from the car floor and supported by said arm, $E^2$. Then the rear end of the truck is pressed downward until its casters rest on the car floor. Then one of the attendants lifts the rear end of the chassis structure away from its bearing against the side wall of the car, and at the same time the extension shaft, D, is pushed upward until the fork, $D^2$, is near the drive shaft tube immediately forward of the drive shaft tube flange of the chassis. Then the shaft, D, is turned to bring the lug, $D^1$, into one of the oblique notches, $C^5$, whereby the shaft, D, is held in the elevated position. Then the rear end of the chassis structure is allowed to come down by gravity until its drive shaft tube rests in the fork, $D^2$, the fork bearing against the drive shaft tube flange.

The rear end of the chassis structure is of such light weight and its forward end is now so supported by the truck as to allow lifting of the rear end by one man. Two men can perform the operation thus far described. The hand lever, $E^5$, is now raised, whereby the lifting arm, $E^2$, is released from its engagement with the box car floor. Now the entire chassis structure is supported on the four caster wheels, B, of the truck. The two men may now push or pull the truck to the box car door and outward through said door upon the stationary platform at the side of the track on which the box car is standing.

On this outer platform the truck may be moved to any suitable place for applying the wheels to the axles of the chassis structure. Heretofore it has been common practice to place the chassis structure on skids whereby space at the ends of the axles was formed for applying the wheels to the axles. It will be understood that any desired means or methods may be used to apply the wheels to the chassis structure while said structure is on my improved truck. For example, the wheels may be placed on the rear axle while the rear end of the chassis structure is still in the elevated position on the truck, the wheels being placed on the forward axle after the forward end of the chassis structure has been raised by any extraneous means.

For lowering the rear end of the chassis structure to bring said structure into the horizontal position, said rear end is raised by one of the attendants to free the fork, $D^2$, from the chassis drive shaft tube. Then the column, $D^2$, and the shaft, D, are allowed to fall rearward until the column, $C^2$, rests on the frame end member, $A^1$. Provision for lowering the elevated rear end of the chassis structure to bring said structure into the horizontal position is important.

In actual use of one of these trucks, I have found that two men can easily operate the truck for unloading these Ford chassis structures. Heretofore, the unloading of such a structure by hand has required the co-working of six men. Furthermore, I have found through actual service that with my improved truck two men can, in a half hour, unload a box car filled with such chassis structures, while six men require three hours for unloading such a car by hand.

For loading these chassis structures into a box car, the operation above described is to be reversed, the chassis structures being placed on the truck and supported thereon by the forward hooks, $A^3$, and the fork, $D^2$, as above described, and the truck with its load being then moved into the box car and then along the box car floor to bring the chassis structure into the cross-wise position which it is to occupy in the box car. Then the fork, $D^2$, is to be released from the rear end of the chassis structure. Then the rear end of the truck is to be raised to allow the hooks, $A^3$, to descend until the forward automobile axle rests on the box car floor. Then the truck is to be moved backward to free the hooks, $A^3$, after which the truck is free to be taken out of the car.

It is to be noted further that when the truck is folded, it is low or close to the floor. This feature is desirable, in order that the truck may be conveniently handled when not loaded and in order that it may be conveniently placed under a chassis structure, and in order that the chassis structure when loaded on the truck may easily be brought to or nearly to the horizontal position for unloading.

I claim as my invention:

1. In a truck, a horizontal frame, wheels supporting said frame, hooks located on the forward end of the frame and forward of the forward wheels and adapted to reach under the forward axle of an automobile chassis structure placed in an inclined position the forward end resting on a floor and the rear end being elevated, an adjustable support located at the rear of said frame and adapted to reach upward for engaging and supporting the rear end of the chassis structure, and operator-controlled means for raising the forward end of the truck including the forward wheels from the floor, substantially as described.

2. In a truck, a horizontal quadrangular frame, wheels supporting said frame at each corner, hooks located on the forward end of the frame and forward of the forward wheels and adapted to reach under the forward axle of an automobile chassis structure placed in an inclined position the forward end resting on a floor and the rear end being elevated, a support hinged to the rear end of the frame and adapted to be directed upward for engaging and supporting the rear end of the chassis structure, and operator-controlled means for raising the forward end of the truck including the forward wheels from the floor, substantially as described.

3. In a truck, a horizontal quadrangular frame, wheels supporting said frame at each corner, hooks located on the forward end of the frame and forward of the forward wheels and adapted to reach under the forward axle of an automobile chassis structure placed in an inclined position the forward end resting on a floor and the rear end being elevated, a telescoping support hinged to the rear end of the frame and comprising lateral braces and adapted to be directed upward for engaging and supporting the rear end of the chassis structure, and operator-controlled means for raising the forward end of the truck including the forward wheels from the floor, substantially as described.

4. In a truck, a horizontal frame, wheels supporting said frame, hooks located on the forward end of the frame and forward of the forward wheels and adapted to reach under the forward axle of an automobile chassis structure placed in an inclined position the forward end resting on a floor and the rear end being elevated, a support hinged to the rear end of the frame and adapted to be directed upward for engaging and supporting the rear end of the chassis structure, and operator-controlled means for raising the forward end of the truck, when loaded, and moving the truck rearward, substantially as described.

5. In a truck, a horizontal frame, wheels supporting said frame, hooks located on the forward end of the frame and forward of the forward wheels and adapted to reach under the forward axle of an automobile chassis structure placed in an inclined position the forward end resting on a floor and the rear end being elevated, a telescoping support hinged to the rear end of the frame and laterally braced and adapted to be directed upward for engaging and supporting the rear end of the chassis structure, and operator-controlled means for raising the forward end of the truck and moving, when loaded, the truck rearward, substantially as described.

6. In a truck, a horizontal frame, wheels supporting said frame, hooks located on the forward end of the frame and forward of the forward wheels and adapted to reach under the forward axle of an automobile chassis structure placed in an inclined position the forward end resting on a floor and the rear end being elevated, an adjustable support located at the rear of said frame and adapted to reach upward for engaging and supporting the rear end of the chassis structure, and operator-controlled means including a rock shaft, a link, and a hand lever and a locking stud for raising the forward end of the truck and locking said raising mechanism in the raised position, substantially as described.

In testimony whereof I have signed my name, this 4th day of March in the year one thousand nine hundred and twenty-four.

WILLIAM F. JARNAGIN.